United States Patent [19]
Jing et al.

[11] Patent Number: 5,728,773
[45] Date of Patent: Mar. 17, 1998

[54] FLUOROELASTOMER COMPOSITION WITH ORGANO-ONIUM AND BLOCKED-CARBONATE COMPOUNDS

[75] Inventors: Naiyong Jing, Woodbury; Robert E. Kolb, Afton, both of Minn.

[73] Assignee: Minnesota Mining and Manufacturing Company, St. Paul, Minn.

[21] Appl. No.: 804,447

[22] Filed: Feb. 21, 1997

[51] Int. Cl.$^6$ .............................. C08L 27/16; C08L 27/18; C08L 27/22
[52] U.S. Cl. .................... 525/146; 525/193; 525/194; 525/248; 525/255; 525/259; 525/261; 525/326.3; 525/326.4
[58] Field of Search ........................ 525/146, 193, 525/194, 248, 255, 259, 261, 326.3, 326.4

[56] References Cited

U.S. PATENT DOCUMENTS

| | | | |
|---|---|---|---|
| 3,373,139 | 3/1968 | Morgan | 260/47 |
| 3,876,654 | 4/1975 | Pattison | 260/30.4 |
| 3,933,732 | 1/1976 | Schmiegel | 260/42.27 |
| 4,177,223 | 12/1979 | Arhart et al. | 525/331 |
| 4,233,421 | 11/1980 | Worm | 525/343 |
| 4,810,760 | 3/1989 | Strepparola et al. | 525/359.3 |
| 4,882,390 | 11/1989 | Grootaert et al. | 525/326.3 |
| 4,894,418 | 1/1990 | Strepparola et al. | 525/185 |
| 4,912,171 | 3/1990 | Grootaert et al. | 525/340 |
| 5,086,123 | 2/1992 | Guenthner et al. | 525/276 |
| 5,262,490 | 11/1993 | Kolb et al. | 525/343 |
| 5,266,650 | 11/1993 | Guerra et al. | 525/326.4 |
| 5,384,374 | 1/1995 | Guerra et al. | 525/326.4 |
| 5,591,804 | 1/1997 | Coggio et al. | 525/276 |

OTHER PUBLICATIONS

Kirk–Othmer, *Encyclopedia of Chemical Technology*, "Fluorocarbon Elastomers," 4th ed., vol. 8, pp. 990–1005, John Wiley & Sons, New York (1979).

Venkateswarlu et al., presentation entitled "Elucidation of Chemical Events Occurring in the Solid Phase During the Curing of Fluoroelastomers with Bisphenol," No. 123, (presented in Detroit Michigan, Oct. 17–20, 1989).

*Primary Examiner*—Robert E. Sellers
*Attorney, Agent, or Firm*—John A. Burtis

[57] ABSTRACT

This invention provides curable fluoroelastomer compositions comprising: (a) a fluorine-containing polymer or blend of fluorine-containing polymers each comprising interpolymerized units derived from one or more fluorine-containing ethylenically unsaturated monomers; (b) at least one organo-onium compound such as those selected from the group consisting of ammonium, arsonium, phosphonium, stibonium, amino-phosphonium, phosphorane (e.g. triarylphosphorane), iminium, and sulfonium compounds; and (c) one or more aryl, allyl or alkyl carbonate-blocked compound as a crosslinking agents. Methods of curing fluoroelastomer compositions, and articles made therefrom are also described.

19 Claims, No Drawings

FLUOROELASTOMER COMPOSITION WITH ORGANO-ONIUM AND BLOCKED-CARBONATE COMPOUNDS

FIELD OF THE INVENTION

This invention relates to fluorocarbon elastomers and their curing. In another aspect it relates to improved scorch safety of curable fluoroelastomers.

BACKGROUND OF THE INVENTION

Fluorocarbon elastomers are synthetic elastomeric polymers with a high fluorine content—see, for example, W. M. Grootaert et al., *Fluorinated Elastomers*, 8 KIRK-OTHMER ENCYCLOPEDIA OF CHEMICAL TECHNOLOGY 990–1005 (4th ed. 1993). Fluorocarbon elastomers, particularly the copolymers of vinylidene fluoride with other ethylenically unsaturated halogenated monomers such as hexafluoropropene ($C_3F_6$) have become the polymers of choice for high temperature applications, such as seals, gaskets, and linings. These polymers exhibit favorable properties against the exposure to aggressive environments such as solvents, lubricants, and oxidizing or reducing agents. Additionally, these polymers can be compounded and cured to have high tensile strength, good tear resistance, and low compression set.

Presently used curing agents for fluoroelastomers include aromatic polyhydroxy compounds, such as polyphenols, used in combination with certain vulcanization accelerators such as ammonium, phosphonium, or sulfonium compounds. U.S. Pat. Nos. 4,882,390 (Grootaert et al.), 4,912,171 (Grootaert et al.) and 5,086,123 (Guenthner et al.), for example, describe these compounds.

In accordance with conventional curing processes, desired amounts of compounding ingredients and other conventional adjuvants or ingredients are added to unvulcanized fluorocarbon elastomer stock and intimately admixed or compounded therewith by employing any of the usual rubber mixing devices such as Banbury mixers, roll mills, or other convenient mixing device. The components and adjuvants are distributed throughout the fluorocarbon gum during milling, during which period the temperature of the mixture typically will not rise above about 120° C. The curing process typically comprises either injecting (injection molding) the compounded mixture into a hot mold or pressing (compression molding) the compounded mixture in a mold, e.g. a cavity or a transfer mold, followed subsequently by an oven-cure (post cure).

Many conventional fluoroelastomer compositions tend toward "scorching" behavior, i.e., the premature crosslinking or partial cure of the composition when exposed to elevated temperatures or conditions of high shear. This scorching behavior particularly is pronounced when the fluoroelastomer is injection molded, wherein scorching is characterized by a premature cure initiation occurring prior to and during injection of the compounded composition into a mold. The point of cure initiation for injection-molded fluoroelastomers may be defined as the time after which the compounded fluoroelastomer is subjected to injection molding conditions (i.e., upon introduction into an injection barrel at a temperature above approximately 70°–90° C. and/or while injecting the compound into the mold under high shear at temperatures between about 180° and 200° C.) when the curing compound begins to gel or harden. Such a change in physical properties, particularly the corresponding viscosity increase, can greatly reduce processing efficiency by hindering the ability to inject the compounded mixture into a mold. Scorching phenomena also produce high levels of waste product; because a cured fluoroelastomer is very difficult to reprocess, any fluoroelastomer that cures outside the mold cavity must usually be discarded.

Fluoroelastomer compositions that are formulated for high crosslink density (e.g., to achieve high modulus or low elongation) show low elongation at break, and hence articles having complex geometric profiles often crack or tear upon demolding when allowed to fully crosslink inside a mold upon injection molding or press curing. The internal and external defecting of such articles has a self-evident detrimental effect on the properties of the cured product, and where a high percentage of articles must be rejected because of such defects, the overall efficiency of a manufacturing process can be greatly compromised.

SUMMARY OF THE INVENTION

Briefly, in one aspect, this invention provides curable fluoroelastomer compositions comprising: (a) a fluorine-containing polymer or blend of fluorine-containing polymers each comprising interpolymerized units derived from one or more fluorine-containing ethylenically unsaturated monomers; (b) at least one organo-onium compound such as those selected from the group consisting of ammonium, arsonium, phosphonium, stibonium, amino-phosphonium, phosphorane (e.g. triarylphosphorane), iminium, and sulfonium compounds; and (c) one or more carbonate-blocked crosslinking agents.

In a second aspect, the present invention provides curable fluoroelastomer compositions exhibiting improved safety against scorch phenomena comprising: (a) a fluorine-containing polymer or blend of fluorine-containing polymers each comprising interpolymerized units derived from one or more fluorine-containing ethylenically unsaturated monomers; (b) at least one organo-onium compound; and (c) one or more aryl carbonate-blocked crosslinking agents. In another aspect, this invention provides curable fluoroelastomer compositions exhibiting improved scorch safety comprising: (a) a fluorine-containing polymer or blend of fluorine-containing polymers each comprising interpolymerized units derived from one or more fluorine-containing ethylenically unsaturated monomers; (b) at least one organo-onium compound; and (c) a mixture of aryl carbonate-blocked crosslinking agent and one or more crosslinking agents selected from the group consisting of alkyl and allyl carbonate-blocked compounds.

In yet another aspect, this invention provides curable fluoroelastomer compositions having improved resistance to mold-defecting comprising: (a) a fluorine-containing polymer or blend of fluorine-containing polymers each comprising interpolymerized units derived from one or more fluorine-containing ethylenically unsaturated monomers; (b) at least one organo-onium compound; and (c) a mixture of: (1) one or more crosslinking agents selected from the group consisting of alkyl, allyl, and aryl carbonate-blocked compounds; and (2) one or more crosslinking agents selected from the group consisting of polyphenol and fluorinated ether and aliphatic diol compounds.

The present invention also provides methods of improving the scorch safety and mold-defect resistance properties of curable fluoroelastomer compositions using the aforementioned compositions.

DETAILED DESCRIPTION OF THE INVENTION

The combinations of an organo-onium compound and the carbonate derivatives of the present invention provide increased processing control in the curing of fluoroelastomer compositions, and in the formation of articles derived therefrom, without adversely affecting the physical properties of those cured compositions and articles.

The use of aryl carbonate-blocked crosslinking agent in accordance with the teachings of the invention, either alone or in combination with one or more other crosslinking agents, yields improved scorch safety of curable fluoroelastomers by providing a retarded cure at pre-molding temperatures below about 150° C. and a rapid cure at molding temperatures above about 180° C. The ability significantly to retard this curing mechanism outside of the mold (where the temperature of the admixture typically do not exceed 150° C.) drastically reduces the probability of severe scorching behavior and consequently reduces attendant processing difficulties. Such ability also allows for heating of the compound above the typical 70°–90° C. window provided by the prior art compositions, thereby reducing the viscosity of the curable fluoroelastomer composition and increasing its flow rate into the mold, resulting in reduced cycle times.

Ideally, a compounded fluoroelastomer mixture should be fully injected into a mold before any significant change occurs in the mixture's rheologic properties and ideally any compounded fluoroelastomer residing outside the mold cavity should remain uncured. Through effective protection of the crosslinking agent within a compounded fluoroelastomer by substituting thereon one or more aryl carbonate constituent groups, it has been found that the fluoroelastomer cure is significantly retarded at temperatures below approximately 150° C., maintains a rapid cure mechanism at mold temperatures of between about 180° C. and about 200° C., and results in a cured product with physical properties that meet or exceed those specified for conventionally cured fluoroelastomer products. In accordance with the present invention, cure retardations of up to 90 minutes are achieved at temperatures at or below 150° C. with complete vulcanization being obtained for the same formulations within 3 to 4 minutes at temperatures of 200° C.

In another aspect of the present invention the use of an alkyl, allyl, or aryl carbonate-blocked crosslinking agent, together with one or more other crosslinking agents (e.g., conventional polyhydroxy crosslinking agents), provides fluoroelastomer compositions that are easily released from a mold cavity at a low press cure state without defect (i.e., free from cracking or tearing in cases where a part has a convoluted geometry) and that may be post cured to affect a desired crosslink density outside the mold. Through effective protection of the crosslinking agent within a compounded fluoroelastomer by substituting thereon certain alkyl, allyl, or aryl carbonate constituent groups, the curable compositions into which such crosslinking agents are compounded may be formulated, together with another crosslinking agent (e.g., a conventional bisphenol crosslinking agent) such that the composition will cure inside the mold generally only to the degree the latter said crosslinking agent is present (i.e., a "low" state of cure). Fluoroelastomer compositions formulated in such a manner will release easily from a mold without defect, and such a composition subsequently may be cured to a desired crosslink density (i.e., fully cured) outside the mold cavity during a post cure at an elevated temperature.

Among the polymers that may be compounded in accordance with this invention are generally the elastomeric copolymers whose interpolymerized units are derived from one or more of the following fluoromonomers: vinylidene fluoride, hexafluoropropene, chlorotrifluoroethylene, 2-chloropentafluoropropene, fluorinated vinyl ethers, fluorinated allyl ethers, tetrafluoroethylene, 1-hydropentafluoropropene, dichlorodifluoroethylene, trifluoroethylene, and mixtures thereof. Said fluoromonomers may also be copolymerized with other compounds such as with other cure-site monomers (e.g., bromine-containing monomers or perfluorinated monomers such as perfluorobenzyl vinyl either) or with non-fluorinated alpha-olefin co-monomers (e.g. ethylene or propylene). Preferred elastomers are copolymers of vinylidene fluoride and at least one terminally ethylenically-unsaturated fluoromonomer containing at least one fluorine atom substituent on each double-bonded carbon atom, each carbon atom of said fluoromonomer being substituted only with fluorine and optionally with chlorine, hydrogen, a lower fluoroalkyl radical, or a lower fluoroalkoxy radical.

Fluoroelastomer copolymers according to the type described above are available commercially as copolymer gumstock under for example the "Fluorel" trademark by Dyneon LLC of Saint Paul, Minn. Suitable products of this line include Fluorel™ FC-2230, FC-2145, FC-2178, and FC-2211. Other commercially available products include fluoroelastomers sold under the "Viton" trademark.

The organo-onium compound which is admixed with the fluorine-containing polymer is capable of functioning as a vulcanization accelerator. As is known in the art, an organo-onium is the conjugate acid of a Lewis base (e.g. phosphine, amine, ether, and sulfide) and can be formed by reacting said Lewis base with a suitable alkylating agent (e.g., an alkyl halide or acyl halide) resulting in an expansion of the valence of the electron donating atom of the Lewis base and a positive charge on the organo-onium compound. Many of the organo-onium compounds useful in the present invention contain at least one heteroatom, i.e., a non-carbon atom such as N, P, S, O, bonded to organic or inorganic moieties. One class of quaternary organo-onium compounds particularly useful in the present invention broadly comprises relatively positive and relatively negative ions wherein a phosphorus, arsenic, antimony or nitrogen generally comprises the central atom of the positive ion, and the negative ion may be an organic or inorganic anion (e.g., halide, sulfate, acetate, phosphate, phosphonate, hydroxide, alkoxide, phenoxide, bisphenoxide, etc.).

Many of the organo-onium compounds useful in this invention are described and known in the art. See, for example, U.S. Pat. Nos. 4,233,421 (Worm), 4,912,171 (Grootaert et al.), 5,086,123 (Guenthner et al .), and 5,262, 490 (Kolb et al.) all of whose descriptions are herein incorporated by reference. Representative examples include the following individually listed compounds and mixtures thereof:

triphenylbenzyl phosphonium chloride
tributylallyl phosphonium chloride
tributylbenzyl ammonium chloride
tetrabutyl ammonium bromide
triaryl sulfonium chloride
8-benzyl-1,8-diazabicyclo [5,4,0]-7-undecenium chloride
benzyl tris(dimethylamino) phosphonium chloride
benzyl(diethylamino)diphenylphosphonium chloride Another class of organo-oniums finding utility in the practice of this invention include acid-functional oniums that can represented by Formula I below.

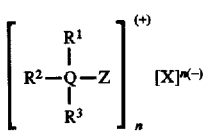

wherein:

Q is a nitrogen, phosphorus, arsenic, or antimony;

Z may be a substituted or unsubstituted, cyclic or acyclic alkyl group having from 4 to about 20 carbon atoms that is terminated with a group of the formula —COOA where A is a hydrogen atom or is a metal cation or Z is a group of the formula $CY_2$—COOR' where Y is a hydrogen or halogen atom, or is a substituted or unsubstituted alkyl or aryl group having from 1 to about 6 carbon atoms that may optionally contain one or more catenary heteroatoms and where R' is a hydrogen atom, a metal cation, an alkyl group, or is an acyclic anhydride, e.g., a group of the formula —COR where R is an alkyl group or is a group that itself contains organo-onium (i.e., giving a bis organo-onium); preferably, R' is hydrogen; Z may also be a substituted or unsubstituted, cyclic or acyclic alkyl group having from 4 to about 20 carbon atoms that is terminated with a group of the formula —COOA where A is a hydrogen atom or is a metal cation;

$R^1$, $R^2$, and $R^3$ are each independently an alkyl, aryl, alkenyl, or any combination thereof; each $R^1$, $R^2$, and $R^3$ can be substituted with chlorine, fluorine, bromine, cyano, —OR" or —COOR" where R" is a $C_1$ to $C_{20}$ alkyl, aryl, aralkyl, or alkenyl, and any pair of the $R^1$, $R^2$, and $R^3$ groups can be connected with each other and with Q to form a heterocyclic ring; one or more of the $R^1$, $R^2$, and $R^3$ groups may also be group of the formula Z where Z is as defined above;

X is an organic or inorganic anion (e.g., halide, sulfate, acetate, phosphate, phosphonate, hydroxide, alkoxide, phenoxide, or bisphenoxide); and n is a number equal to the valence of the anion X.

Another class of useful organo-onium compounds include those having one or more pendent fluorinated alkyl groups. Generally, the most useful such fluorinated onium compounds are disclosed by Coggio et al. In U.S. Pat. No. 5,591,804. Representative of this useful class of onium compounds are the following:

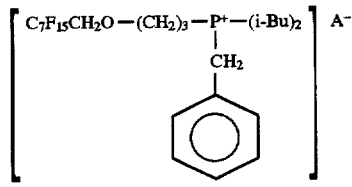

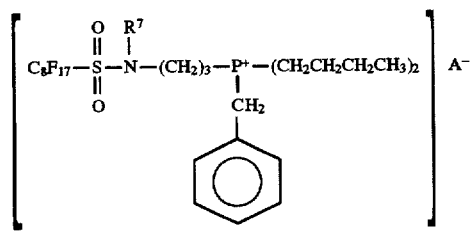

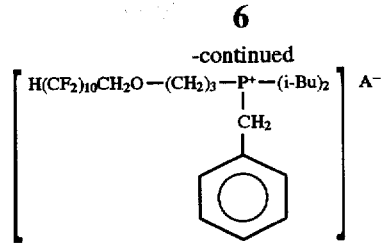

The most common conventional crosslinking agent for a fluorocarbon elastomer gum is a polyhydroxy compound. The polyhydroxy compound may be used in its free or non-salt form or as the anionic portion of the chosen organo-onium accelerator. The crosslinking agent may be any of those polyhydroxy compound known in the art to function as a crosslinking agent or co-curative for fluoroelastomers, such as those polyhydroxy compounds disclosed in U.S. Pat. Nos. 3,876,654 (Pattison), and 4,233,421 (Worm). Representative aromatic polyhydroxy compounds include any one of the following: di-, tri-, and tetrahydroxybenzenes, naphthalenes, and anthracenes, and bisphenols of the following formula:

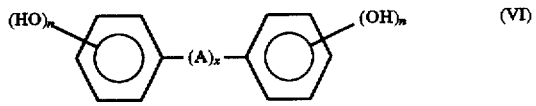

wherein A is a difunctional aliphatic, cycloaliphatic, or aromatic radical of 1 to 13 carbon atoms, or a thio, oxy, carbonyl, sulfonyl, or sulfonyl radical, A is optionally substituted with at least one chlorine or fluorine atom, x is 0 or 1, n is 1 or 2, and any aromatic ring of the polyhydroxy compound is optionally substituted with at least one atom of chlorine, fluorine, bromine, or with a carboxyl or an acyl radical (e.g., —COR where R is H or a $C_1$ to $C_8$ alkyl, aryl, or cycloalkyl group) or alkyl radical with, for example, 1 to 8 carbon atoms. It will be understood from the above bisphenol formula that the —OH groups can be attached in any position (other than number one) in either ring. Blends of two or more of these compounds are also used.

One of the most useful and commonly employed aromatic polyphenols of the above formula is 4,4'-hexafluoroisopropylidenyl bisphenol, known more commonly as bisphenol AF. The compounds 4,4'-dihydroxydiphenyl sulfone (also known as Bisphenol S) and 4,4'-isopropylidenyl bisphenol (also known as bisphenol A) are also widely used in practice.

Another class of crosslinking compounds that find utility in the practice of the invention comprise generally those with a fluorinated ether or an aliphatic diol structure. Classes of fluorinated ether crosslinking agents are described, for example, by U.S. Pat. Nos. 4,810,760 and 4,894,418, both to Strepparola et al., and by U.S. Pat. Nos. 5,266,650 and 5,384,374, both to Guerra et al., all of whose descriptions are incorporated herein by reference. This general class of crosslinking compounds include the following individual representative difunctional fluorinated ether compounds:

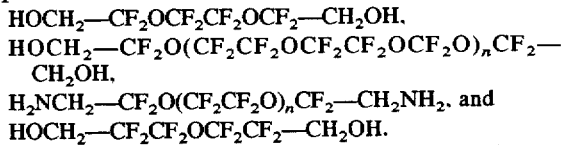

Difunctional ether crosslinking agents may be used alone or in combination with other crosslinking agents or along with monofunctional ether compositions. One or more mono- or difunctional fluorinated ether salts, including salts of the above-depicted representative compounds may also be employed, fluorinated ether salts possessing an added advantage of easy incorporation into a fluoroelastomer gum.

Functional fluoroaliphatic ether salts useful to crosslink a fluoroelastomer composition generally comprise a perfluoroether structure each end of which is bonded to a terminal group wherein at least one of such terminal groups is an alkoxide metal salt such as —$CH_2OMgOH$, —$CH_2OCaOH$, or —$CH_2OZnOH$, etc, or is an amino salt such as —$CH_2NH_3^+Cl^-$. Such salts include, for example, functional fluoroaliphatic mono- or polyether salts, e.g.:

$HOMgOCH_2$—$CF_2OCF_2CF_2OCF_2$—$CH_2OMgOH$, $HOMgOCH_2$—$CF_2O(CF_2CF_2OCF_2CF_2OCF_2O)_nCF_2$—$CH_2OMgOH$ $HOMgOCH_2$—$CF_2O(CF_2CF_2OCF(CF_3)\ CF_2OCF_2O)_n$ $CF_2$—$CH_2OMgOH$ $HOMgOCH_2$—$CF_2CF_2OCF_2CF_2$—$CH_2OMgOH$, and $CF_3$—$O(CF_2CF_2O)_n$—$CF_2$—$CH_2OMgOH$ $Cl^-\ NH_3^+$—$CH_2$—$CF_2OCF_2CF_2OCF_2$—$CH_2$—$NH_3^+Cl^-$ $Cl^-\ NH_3^+$—$CH_2$—$CF_2CF_2OCF_2CF_2$—$CH_2OCaCl$ $HOMgOCH_2$—$CF_2OCF_2CF_2OCF_2$—$CH_2OCH_2CH=CH_2$ Difunctional fluorinated aliphatic diol and ether-containing salts useful for the above-stated purpose include those that may be represented generally by Formula VII below.

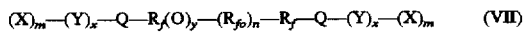

(VII)

wherein:

each $R_f$ is, independently, a linear or branched perfluoroalkylene group of 1 to about 20 carbon atoms;

$R_{fo}$ comprises linear or branched perfluoroalkylene ether groups wherein said groups may be random, block, or any combination thereof; representative $R_{fo}$ groups include:

—$(CF_2)_2$—O—, —$CF_2O$—, —$(CF_2)_3$—O—, —$(CF_2)_4$—O—, —$CF_2$—$CF_2$—O—$CF_2$—O—, —$CF_2$—$CF_2$—O—$CF_2$—$CF_2$—O—$CF_2$—O—, —$(CF_2$—$CF(CF_3)$—$O)_n$—;

each Q is, independently, a divalent linking group that is preferably selected from the group consisting of: —O—, —$C_6H_3(R')O$—, —$CH_2CR_2O$—, —$CR_2O$—, Z—$N^+H_3$—$C_6H_3(R')$—, and Z—$NH_3^+$—$CH_2$— where R is a hydrogen atom or is a fluorinated or non-fluorinated alkyl group preferably having from 1 to about 2 carbon atoms and preferably fluorinated, R' is a hydrogen or halogen atom or is a substituted or unsubstituted, cyclic or acyclic alkyl or aryl group having 1 to 10 carbon atoms that may optionally contain one or more catenary heteroatoms, and where Z is a anion such as a halide; the oxygen atoms depicted in the formulas immediately above will be connected to the depicted Y groups where such Y groups are present;

each Y is, independently, a divalent metal atom, such as Mg, Zn, Ca, or Ni, or a monovalent metal atom, such a Na, Li, or K; a divalent metal is preferred, Mg being particularly preferred;

each X is, independently, a halogen atom, a hydroxyl group, or is of the formula —OR" or —OOCR" where R" is a short-chain alkyl group having from 1 to about 4 carbon atoms;

n is a number from 0 to 30;

x is 0 or 1 with the proviso that when Q is terminated by an amino group, such as where Q is Z—$N^+H_3$—$C_6H_3(R')$— or Z—$N^+H_3$—$CH_2$— as depicted supra, x is 0;

y is 0 or 1; and m is 0 or 1 with the proviso that when Y is a monovalent metal atom, such as Na, Li, or K, m is 0; when Y is a divalent metal atom, m is 1; and when x is 0, m is 0.

Monofunctional fluorinated aliphatic diol and ether salts useful in combination with one or more difunctional fluorinated ether-containing compounds include those that may be represented generally by Formula VIII below:

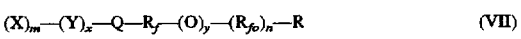

(VIII)

wherein:

$R_f$, $R_{fo}$, Q, Y, X, x, y, m, and n are as defined supra for Formula VII; and R' is a monovalent, fluorinated or non-fluorinated alkyl or aryl group containing from 1 to about 10 carbon atoms or is a fluorinated or non-fluorinated allyl group containing from 2 to 10 carbon atoms.

The carbonate-blocked compounds used as crosslinking agents in accordance with the present invention include those polyphenol and difunctional fluorinated ether and aliphatic diol compounds specified above wherein one or more of the substituent terminal hydroxyl groups are replaced by certain carbonate constituent groups. The most useful carbonate-protected compounds may be depicted generally by the following formula:

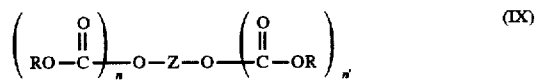

(IX)

wherein:

Z is an aryl or polyaryl group, and is preferably a polyphenyl group of the formula:

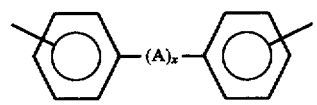

wherein A and x are as defined supra by Formula VI; or is a fluorinated ether or aliphatic diol group of the formula:

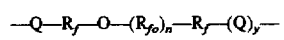

wherein Q, $R_f$, $R_{fo}$, n, and y are as defined supra by Formula VII;

R is an aryl group or is an allyl or alkyl substituent of the formula $CX(R')_2$ where X is hydrogen or a halogen atom other than fluorine and where each R' is, independently from the other, hydrogen, a halogen atom, or a non-fluorinated alkyl or allyl group that may be straight-chained, branched, cyclic or acyclic and that may optionally contain one or more heteroatoms, i.e. a non-carbon atom such as nitrogen or oxygen; representative alkyl substitutents include methyl, ethyl, isobutyl, isopropyl, and $CCl_3CH_2$; and n and n' each is independently selected as 0 or 1 with the proviso that when either n or n' is 0, its corresponding portion of the Z moiety is terminated by hydrogen (i.e., its corresponding terminal portion is —Z—OH) or is terminated by a metal or nonmetal cation.

It will be understood that the carbonate-blocked compounds may be oligomerized carbonates. Oligomer carbonates, so formed, are also useful in the practice of the invention and are considered within the scope thereof. It will be further understood that the above-depicted carbonate-blocked crosslinking agents may have only one carbonate substituent (such as when one n or n' of Formula IX is 0) and where more than one carbonate substituent is present, that substituent may be the same or may be different in structure than the other substituent or substituents present (e.g., having one alkyl and one aryl substituent).

One or more protected carbonate-blocked crosslinking agents may be utilized alone or in combination with one or more conventional crosslinking agents (such as those polyphenol compounds depicted supra by Formula VI or those fluorinated ether compounds depicted supra by Formula VII). In practice of the invention, the crosslinking agent or mixture of crosslinking agents may be compounded within a curable fluoroelastomer composition to control the curing mechanism of the fluoroelastomer. Depending upon the particular mechanism desired, the composition may be formulated to exhibit a high degree of scorch safety by controlling the temperature of cure initiation, or the composition may be formulated to provide a substantially defect-free molded fluoroelastomer article by limiting the state of cure that occurs inside the mold, allowing the article to instead fully cure, or set, outside the of mold cavity during a post-cure at elevated temperatures. Briefly, in one aspect, a highly scorch safe curable fluoroelastomer composition may be formulated by incorporating one or more aryl carbonate-blocked crosslinking agents into the composition either alone, or in combination with one or more other crosslinking agents, preferably together with one or more alkyl or allyl carbonate-blocked crosslinking agents.

Briefly, in another aspect, fluoroelastomer compositions that exhibit the latter-described two-stage curing capacity may be formulated by incorporating therein one or more alkyl, allyl, or aryl carbonate-blocked crosslinking agents. Those alkyl, allyl, or aryl carbonate-blocked crosslinking compounds useful in this two-stage curing embodiment will be those that are thermally stable under conditions of press cure or injection molding and thereby survive the initial curing process. These compounds are believed to undergo decarboxylation during post-cure at which time their corresponding active crosslinking agent is released and cures into the fluoroelastomer composition. In such an embodiment, the alkyl, allyl, or aryl carbonate-blocked crosslinking agent is combined with one or more other crosslinking agents, for example with either a conventional crosslinking compound as taught by one aspect of this invention.

Aryl carbonate-blocked compounds useful in the formulations described above include those according to Formula IX, supra, wherein each depicted —R group is independently selected as a substituted or unsubstituted aryl group such as those aryl substituent groups according to Formula X below.

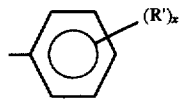 (X)

where x is a number between 1 and 4 inclusive and where R' is hydrogen, a halogen atom, or is an acyl, aryl, polyaryl (fused to or separated from the aromatic ring) or alkyl radical substituent (or any combination thereof), the latter three of which may be fluorinated but are preferably non-fluorinated and may be straight-chained, branched, cyclic. The —R' group may optionally contain one or more catenary heteroatoms, i.e. a non-carbon atom such as nitrogen or oxygen. It will be understood from the above formula that the constituent —R' group can be attached in any position in the ring relative to the bond attaching it to the carbonate group depicted in Formula IX. Particularly preferred aryl carbonate-blocked polyphenyl crosslinking agents for use in the present invention include 4,4'-(hexafluoroisopropylidenylbisphenyl) (p-nitrophenyl) dicarbonate and 4,4'-(hexafluoroisopropylidenylbisphenyl) (3,5-dichlorophenyl) dicarbonate.

Alkyl and allyl carbonate-blocked compounds particularly useful in one embodiment of the invention include those according to Formula IX, supra, wherein each depicted —R group is independently selected as a substituted or unsubstituted alkyl or allyl group such as would result in a carbonate-blocked compounds according to Formula XI depicted below.

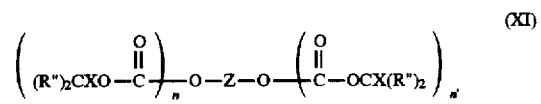 (XI)

wherein:

Z, n, and n' are as defined supra by Formula IX;

X is hydrogen or is a halogen atom other than fluorine;

R" is hydrogen, a halogen atom other than fluorine, or is a substantially non-fluorinated alkyl or allyl group having from 1 to about 20 carbon atoms; said alkyl group may be cyclic or acyclic, linear or branched, fluorinated or non-fluorinated, may be unsubstituted or may be substituted with an aryl or with one or more functional groups, and may contain one or more catenary heteroatoms such as oxygen, nitrogen, or sulfur; said alkyl group preferably is a linear alkyl group having from 1 to about 4 carbon atoms, e.g., methyl, ethyl, propyl, etc.

Fluoroaliphatic sulfonamides can also be added to the compositions of the invention, including those of the formula $R_fSO_2NHR"$, where R" is an alkyl radical having, for example, from 1 to 20 carbon atoms, preferably from 1 to 12 carbon atoms, $R_f$ is a fluoroaliphatic radical such as a perfluoroalkyl, e.g., $C_nF_{2n+1}$ where n is 1 to 20, or perfluorocycloalkyl, e.g., $C_nF_{2n-1}$ where n is 3 to 20, such compounds being described, for example, in U.S. Pat. No. 5,086,123 (Guenther et al.). The fluoroaliphatic sulfonamide is preferably a perfluoroalkylsulfonamide and may be added as a separate compound, or as the anion of the organo-onium compound.

Fillers can be mixed with the fluoroelastomer gum to improve molding characteristics and other properties. When a filler is employed, it can be added to the vulcanization recipe in amounts of up to about 100 parts per hundred parts by weight of gum, preferably between about 15 to 50 parts per hundred parts by weight of the gum. Examples of fillers which may be used are reinforcing thermal or furnace grade carbon blacks or non-black pigments of relatively low reinforcement characteristics such as clays and barytes.

The cure accelerators and crosslinking agent or agents can be added to the uncured polymer gum in the form of finely divided solids or as solutions in alcohol or ketone solvents by mixing the materials into the polymer gum stock. Thus mixed, the gum stock can generally be stored at room temperature for extended periods of time.

Prior to curing, an acid acceptor is mixed into the gum stock, after which storage life of the stock is more limited. Acid acceptors can be inorganic or blends of inorganic and organic. Examples of inorganic acceptors include magnesium oxide, lead oxide, calcium oxide, calcium hydroxide, dibasic lead phosphite, zinc oxide, barium carbonate, strontium hydroxide, calcium carbonate, etc. Organic acceptors include epoxies, sodium stearate, and magnesium oxalate. The preferred acid acceptors are magnesium oxide and calcium hydroxide. The acid acceptors can be used singly or in combination, and preferably are used in amounts ranging from about 2 to 25 parts per 100 parts by weight of the polymer gum stock. All of the components of the curing system may be admixed prior to their incorporation into the polymer gum stock without departing from the scope of the invention.

The relative amounts of the crosslinking agent or agents (i.e., the chosen total amount of aryl, alkyl, or allyl carbonate along with conventional crosslinking agents, if any) and onium salt are present in the composition in such amounts as to provide the desired cure and/or mold release of the composition when mixed with acid acceptor. Representative proportions of components of the curing system are as follows:

Acid acceptor:0.5 to 40 phr
Onium salt:0.2 to 5 mmhr
Crosslinker:0.3 to 12 mmhr

All amounts are given in parts per 100 parts polymer gum stock (abbreviated "phr") or in millimoles per hundred parts polymer gum stock (abbreviated "mmhr"). It will be understood that at least one of n and n' is 1 and these proportions are general ranges; the particular amount for each particular cure time and temperature will be apparent to one of ordinary skill in the art.

In accordance with this invention, the desired amounts of compounding ingredients and other conventional adjuvants or ingredients are added to the unvulcanized fluorocarbon gum stock and intimately admixed or compounded therewith by employing any of the usual rubber mixing devices such as internal mixers, (e.g., Banbury mixers), roll mills, or any other convenient mixing device. For best results, the temperature of the mixture on the mill typically should not rise above about 120° C. During milling, it is preferable to distribute the components and adjuvants uniformly throughout the gum for effective cure.

The mixture is then processed and shaped, for example, by extrusion (for example, in the shape of a hose or hose lining) or molding (for example, in the form of an O-seal). The shaped article can then be heated to cure the gum composition and form a cured elastomer article.

Pressing of the compounded mixture (i.e., press cure) is usually conducted at a temperature between about 95° C. and about 230° C., preferably between about 150° C. and about 205° C., for a period of from 1 minute to 15 hours, typically from 5 minutes to 30 minutes. A pressure of between about 700 kPa and about 20,600 kPa is usually imposed on the compounded mixture in the mold. The molds first may be coated with a release agent and prebaked. The molded vulcanizate is then usually post-cured (e.g., oven-cured) at a temperature usually between about 150° C. and about 275° C., typically at about 232° C., for a period of from about 2 hours to 50 hours or more depending on the cross-sectional thickness of the article. For thick sections, the temperature during the post cure is usually raised gradually from the lower limit of the range to the desired maximum temperature. The maximum temperature used is preferably about 260° C., and is held at this value for about 4 hours or more. The compositions of this invention can be used to form seals, O-rings, gaskets, etc.

Various modifications and alterations of this invention will become apparent to those skilled in the art without departing from the scope and spirit of the present invention, and it should be understood that this invention is not to be unduly limited to the illustrative embodiments set forth hereinabove.

EXAMPLES

Test Methods

In the following examples, indicated results were obtained using the following test methods:

Cure Rheology Tests were run on uncured, compounded admixture using a Monsanto Moving Die Rheometer (MDR) Model 2000 in accordance with ASTM D 5289–93a at 177° C., no preheat, 12 minute elapsed time and a 0.5° arc. Minimum torque ($M_L$) and Maximum torque ($M_H$), i.e., highest torque attained during specified period of time when no plateau or maximum torque is obtained, were reported. Also reported were $t_s2$ (time for torque to increase 2 units above $M_L$, t'50 [time for torque to reach $M_L + 0.5(M_H - M_L)$], and t'90 [time for torque to reach $M_L + 0.9(M_H - M_L)$]).

Press—Cure samples. Unless otherwise noted, 150×150× 2.0 mm sheets were prepared for physical property determination by pressing at about 6.9 Mega Pascals (M Pa) for 10 min. at 177° C.

Post-cure samples, unless otherwise noted, were prepared by placing a press-cured sample in a circulating air oven. The oven was maintained at 232° C. and the Samples treated for 16 hrs.

Tensile Strength at Break, Elongation at Break, and Modulus at 100% Elongation were determined using ASTM D 412-92ᵉ on samples cut from the press-cure or post-cure sheet with ASTM Die D. Units reported in Mega Pascals (M Pa).

Hardness was determined using ASTM D 2240-85 Method A with a Type A-2 Shore Durometer. Units are reported in points.

Compression set determined by ASTM 395-89 Method B with 0.139 in. (3.5 mm.) After post-curing, the O-rings were compressed for 70 hrs at 200° C. Results are reported as %.

Synthesis or sources Of Carbonate & Organo-Onium Compounds

The following carbonate-blocked bisphenols are used as crosslinking agents and/or cure modifiers in the examples of fluoroelastomer compositions of the invention.

Synthesis of 4,4'-(hexafluoroisopropylidenylbisphenyl) (p-nitrophenyl) dicarbonate (Carbonate A)

A 250 mL three-necked round bottom flask was assembled with a stirring bar, a refluxing condenser and a thermometer. The flask was charged with 8.5 g of 4,4'hexafluoroisopropylidene-diphenol (Bisphenol-AF), 150 mL of methylene chloride and 7.1 mL of triethylamine. The reaction solution was stirred at room temperature and Bisphenol-AF was rapidly dissolved in the solution. To the solution was slowly added 10.2 g of p-nitrophenyl chloroformate, the reaction started immediately and gave off heat. Some white precipitate appeared in the solution, which was believed to be the hydrochloric triethylamine salt. After addition of the chloroformate, the reaction mixture was allowed to stir overnight. The white solid was filtered and washed with a small portion of methylene chloride. The filtrate and methylene chloride wash were combined and further washed with 4×150 mL water and subsequently dried over $MgSO_4$ overnight. The $MgSO_4$ salt was filtered and washed with 30 mL of methylene chloride. The solvent was removed on a rotary evaporator and the resulting white solid was further dried under vacuum to give 15.2 g (90%) of the expected product. ¹HNMR (400 mhz, $CDCl_3$), 8.34 (m, 4H), 7.48 (m, 8H), 7.33 ppm (m, 4H). ¹⁹FNMR (376 Hz, $CDCl_3$), −64.3 ppm (s,6F). Ms, 666 ($M^{-}$)

Synthesis of one-half equivalent Aryl Carbonate (Carbonate B)

The reaction procedure used was similar to the procedure used to produce Carbonate A except only enough p-nitrophenyl chloroformate was added to react with one-half of the hydroxy groups available. Thus, a mixture of mono-substituted carbonate, di-substituted carbonate and free bisphenol AF resulted.

Synthesis of Bisphenol-AF Bis(chloroformate)

The synthetic procedure used was based on U.S. Pat. No. 3,373,139. A Hastalloy™ Bomb was charged with 4,4'-(hexafluoroisopropylidene)diphenol (8.0 g), 30 g of phosgene and 0.5 g of N,N-dimethylformamide. The mixture was heated for 8 hours at 140° C. After reaction, the excess phosgene was vented. The residual product, a viscous oil, was dissolved in methylene chloride. The methylene chloride was stripped off and the remaining viscous oil was subjected to vacuum distillation to yield a pale yellow syrup at 160° C. and 0.3 mm Hg to give 8.5 g of the expected product. $^{1}$HNMR (400 mhz, $CDCl_3$), 7.45 (d, J=8.8 Hz, 4H), 7.28 ppm (d, J=8.8 Hz, 4H); $^{19}$FNMR (376 Hz, $CDCl_3$), –64.5 ppm (s,6F).

Synthesis of 4,4'-(hexafluoroisopropylidenylbisphenyl) bis (3,5-dichlorophenyl) dicarbonate (Carbonate C)

A 100 mL three-necked flask was charged with 2.6 g of the Bisphenol-AF bis(chloroformate), prepared as described above, 2.8 g of 3,5-dichlorophenol and 50 mL of methylene chloride. The reaction mixture was stirred at room temperature. To the solution was slowly added 1.0 g of triethylamine which gave an immediate reaction which gave off heat. The reaction mixture was stirred at 30° C. overnight (about 15 hours). The reaction solution was then well washed with water (6×50 mL) to remove the side product hydrochloric triethylamine salt and unreacted 3,5-dichlorophenol. The methylene chloride solution was dried over $MgSO_4$. Then, the solution was filtered and the filtrate was subjected to concentration to give about 4 g of a white solid.

Other bisphenol AF based dicarbonate compounds were made in a manner similar to Carbonate A except the following chloroformates were substituted for p-nitro chloroformate:

Carbonate D—ethyl chloroformate was used in the preparation of 4,4'-(hexafluoropropylidenyl)bisphenyl bis (ethyl) dicarbonate, Carbonate E—isopropyl chloroformate was used in the preparation of 4,4'-(hexafluoropropylidenyl)bisphenyl bis (isopropyl) dicarbonate, Carbonate F—trichloroethyl chloroformate was used in the preparation of 4,4'-(hexafluoropropylidenyl)bisphenyl bis (trichloroethyl) dicarbonate.

Carbonate G—isobutyl chloroformate was used in the preparation of 4,4'-(hexafluoropropylidenyl)bisphenyl bis (isobutyl) dicarbonate, Carbonate H—allyl chloroformate was used in the preparation of 4,4'-(hexafluoropropylidenyl)bisphenyl bisallyl dicarbonate.

Carbonate I—Was made in a manner similar to Carbonate A except Bisphenol A (4,4'-isopropyl-biphenyl) was used instead of Bisphenol AF.

Carbonate J—Was made in a manner similar to Carbonate A except Bisphenol S (4,4'-dihydroxydiphenyl sulfone) was used instead of Bisphenol AF.

Carbonate K—Was made in a manner similar to Carbonate A except 4,4'-dihydroxy benzophenone was used instead of Bisphenol AF.

Synthesis of Isopropyl dicarbonate-blocked fluorinated polyether diol (Carbonate L)

The reaction procedure used was similar to the procedure used to produce Carbonate A except 50 g of $HOCH_2(CF_2CF_2O).CF_2CH_2OH$ with an average molecular weight of about 1250, made as described in U.S. Pat. No. 5,384,374, was added to the flask with 80 ml of methylene chloride and 8.5 g of triethylamine. The solution was stirred at room temperature for 1 hour. To the solution was slowly added 90 ml of 1M isopropyl chloroformate in toluene. The reaction mixture was stirred at room temperature for 40 minutes. Then, the solution was heated to 40° C. for overnight. After cooling, the reaction solution was well washed with water 4×150 ml. The organic layers were dried over $MgSO_4$ for 2 hours. The methylene chloride and toluene solvents were removed to give the liquid product (49 g).

Carbonate M—Was made in a manner similar to Carbonate L except isobutyl chloroformate was used instead of isopropyl chloroformate.

Acid substituted Onium A (Onium A)

Acetic acid substituted triphenyl phosphonium chloride was prepared by adding 26.2 g (0.11 moles) of triphenylphosphine and 11.3 g (0.12 moles) of chloroacetic acid in 450 mL of methanol to a suitable flask. The mixture was heated at 35°–40° C. for 24 hours. The solvent was then removed and the product was extracted with ether to give a white solid. This solid was further crystallized four times from absolute ethanol-ether.

Acid substituted Onium B (Onium B)

Acetic acid substituted tributyl phosphonium chloride was prepared by adding 11.3 g of(0.12 mol) chloroacetic acid and 20.2 g (0.10 mol) of tributyl phosphine to 100 mL of methanol. The methanol solution was then heated to 35°–40° C. for 20 hours. The methanol was removed and the reaction product washed with hexane and ether to remove unreacted tributyl phosphine and chloroacetic acid.

Tributyl(2-methoxy)propylphosphonium chloride (Onium C)

Tributyl(2-methoxy)propylphosphonium chloride was prepared as described in U.S. Pat. No. 4,882,390 (Grootaert et al.).

Onium D is tri aryl sulfonium chloride obtained from Advanced Research Chemicals, Inc. of Catoosa, Okla.

Onium E is tetra butyl ammonium chloride available from Aldrich Chemical Co. in Milwaukee, Wis.

Onium F is triphenylbenzyl phosphonium chloride (TPBPCI) available from Aldrich Chemical Co. in Milwaukee, Wis.

GUM TYPES

Commercially available fluoroelastomer gums were compounded with the above prepared compounds and various other ingredients and cured. The cure rheology and physical properties of the cured composition were then determined. The gums used were copolymers which, except as otherwise indicated, have the Mooney Viscosity and nominal weight percents of interpolymerized units derived from the monomers shown below in Table 1. Some additives, such as curatives for example, are listed in quantities of millimoles per hundred parts of gum (mmhr). Other additives are listed in grams. Percentages are in weight % unless otherwise specified.

TABLE 1

Weight % Monomers

| GUM | $CF_2=CH_2$ | $CF_2=CFCF_3$ | $CF_2=CF_2$ | $CH_2=CHCH_3$ | Mooney Viscosity |
|---|---|---|---|---|---|
| A | 60 | 40 | — | — | 38 |
| B | 27 | — | 57 | 16 | 45 |
| C | 35 | 41 | 24 | — | 48 |

Evaluation Of Compositions Comprising Aryl Carbonate Crosslinking Agents

Example 1

In Example 1, a compounded fluoroelastomer gum of the invention was prepared using 100 g of fluoroelastomer Gum A and adding 4.46 g (6.25 mmhr) of Carbonate C., 0.5 g (1.3 mmhr) Onium F, 30 g Thermax N-990 carbon black, 3 g Elastomag 170 MgO, available from Morton Performance Chemicals, Manistee Mich., and 6 g $Ca(OH)_2$ using a two-roll mill and conventional techniques.

A quantity of the compounded gum was used for cure rheology testing and the remainder of the gum was press-cured for 10 minutes at 177° C., and then post-cured for 16 hours at 232° C. The results of rheology tests at several temperatures are shown in Table 2.

Comparative Example C1

In Comparative Example C1, a compounded fluoroelastomer gum was made and evaluated in a manner similar to Example 1 except 6.25 mmhr (2.1 g) of bisphenol AF was used instead of Carbonate C.

TABLE 2

Cure Rheology

| | Example 1 | | | Comparative Example C1 | | |
|---|---|---|---|---|---|---|
| MDR Temp. | 150° C. | 177° C. | 200° C. | 150° C. | 177° C. | 200° C. |
| $M_L$ | 1.0 | 0.4 | 0.2 | 2.2 | 1.0 | 0.9 |
| $M_H$ | 6.2 | 23.1 | 23.9 | 26.7 | 23.3 | 20.4 |
| $t_s2$ | 82.7 | 6.8 | 1.3 | 8.7 | 1.7 | 0.6 |
| t'50 | 84.8 | 7.8 | 1.4 | 12.6 | 2.1 | 0.7 |
| t'90 | 89.2 | 9.7 | 1.9 | 18.4 | 2.9 | 1.1 |

The results in Table 2 indicate that Example 1 has a very low cure activity at the temperature of 150° C., useful cure performance at a temperature of 177° C. and rapid cure response at the 200° C. temperature. At each temperature, the cure of Example 1 is retarded when compared to the Comparative Example C1 results. Physical properties obtained at the post-cure level for Example 1 were Tensile of 14.96M Pa, Elongation of 143%, Modulus of 9.15M Pa and Shore A hardness of 84.

Example 2

In Example 2, a compounded fluoroelastomer gum of the invention was prepared and evaluated in a manner similar to Example 1 except 4.16 g (6.25 mmhr) of 4,4'-(hexafluoroisopropylidenylbisphenyl) (p-nitrophenyl) carbonate (Carbonate A) was used instead of the 4.46 g of Carbonate C. The rheology results (tested at 150° C.) are shown in Table 3.

Example 3

In Example 3, a compounded fluoroelastomer gum of the invention was prepared and evaluated in a manner similar to Example 1 except 3.13 g (6.25 mmhr) of Carbonate B was used instead of the 4.46 g Carbonate C. The rheology results (tested at 150° C) are shown in Table 3.

TABLE 3

CURE RHEOLOGY

| Example Test Temp. | 2 150° C. | 3 150° C. | C1 150° C. |
|---|---|---|---|
| $M_L$ | 1.9 | 1.4 | 2.2 |
| $M_H$ | 19.6 | 21.9 | 26.7 |
| $t_s2$ | 102.6 | 32.5 | 8.7 |
| t'50 | 114.0 | 37.1 | 12.6 |
| t'90 | 152.0 | 46.5 | 18.4 |

The results in Table 3 indicate a retarded cure response for Examples 2 and at these temperatures.

Examples 4–6

In Examples 4–6, compounded fluoroelastomer gums of the invention were prepared and evaluated in a manner similar to Example 1 except the compounds listed below were used instead of Carbonate A.

Example 4 used 6.25 mmhr of Carbonate I.

Example 5 used 6.25 mmhr of Carbonate J.

Example 6 used 6.25 mmhr of Carbonate K.

The control sample used 6.25 mmhr of bisphenol AF.

TABLE 4

MDR Test Temperature of 150° C.

| Example | 4 | 5 | 6 | Control |
|---|---|---|---|---|
| $M_L$ | 1.5 | 0.5 | 2.0 | 2.2 |
| $M_H$ | 24.3 | 1.9 | — | 26.3 |
| $t_s2$ | 60.2 | — | — | 8.7 |
| t'50 | 65.5 | — | — | 12.6 |
| t'90 | 83.0 | * | * | 18.4 |

*no cure after 3 hours

TABLE 5

MDR Test Temperature of 200° C.

| Example | 4 | 5 | 6 | Control |
|---|---|---|---|---|
| $M_L$ | 0.5 | 0.5 | 0.4 | 0.9 |
| $M_H$ | 21.7 | 13.5 | 19.3 | 20.1 |
| $t_s2$ | 2.2 | 9.8 | 12.3 | 0.6 |
| t'50 | 2.5 | 11.8 | 13.9 | 0.7 |
| t'90 | 3.5 | 17.1 | 18.5 | 1.0 |

The data in Table 5 show that useful cure characteristics may be obtained using carbonate-blocked crosslinking agents of various types. The added scorch safety is shown in the longer $t_s2$ and t'50 times for the examples of the invention when compared to the Control.

Evaluation of Compositions Comprising Both ArVl Carbonate and Alkyl Carbonate Crosslinking Agents

Examples 7–10

In Examples 7–10, a compounded fluoroelastomer gum of the invention was prepared and evaluated in a manner similar to Example 1 except Carbonate C was replaced with a combination of carbonate-blocked bisphenols as shown in Table 6. The results of rheology testing are shown in Tables 7 and 8. Comparative Example C1 was described earlier as using 2.1 g of bisphenol AF instead of a carbonate-blocked bisphenol AF.

TABLE 6

| | Example | | | | |
|---|---|---|---|---|---|
| | 7 (mmhr) | 8 (mmhr) | 9 (mmhr) | 10 (mmhr) | C1 (mmhr) |
| Carbonate A | 3.1 | 3.1 | 3.1 | 3.1 | — |
| Carbonate D | 3.1 | — | — | — | — |
| Carbonate E | — | 3.1 | — | — | — |
| Carbonate F | — | — | 3.1 | — | — |
| Carbonate G | — | — | — | 3.1 | — |
| TPBPCl | 1.3 | 1.3 | 1.3 | 1.3 | 1.3 |
| Bisphenol AF | — | — | — | — | 6.25 |

TABLE 7

| MDR Test Temperature of 150° C. | | | | | |
|---|---|---|---|---|---|
| Example | 7 | 8 | 9 | 10 | C1 |
| $M_L$ | 1.6 | 1.7 | 1.6 | 1.7 | 2.2 |
| $t_s2$ | 19.9 | 13.2 | 87.2 | 16.4 | 8.9 |

The results as shown in Table 7 show a similar $M_L$ values for each sample, but the $t_s2$ values of the examples of the invention show the retarded cure onset when compared to $t_s2$ values of Comparative Example C1.

TABLE 8

| MDR Test Temperature of 200° C. | | | | | |
|---|---|---|---|---|---|
| Example | 7 | 8 | 9 | 10 | C1 |
| $M_L$ | 0.5 | 0.6 | 0.5 | 0.6 | 0.9 |
| $M_H$ | 11.2 | 9.9 | 18.5 | 10.3 | 20.1 |
| $t_s2$ | 0.8 | 0.7 | 1.5 | 0.8 | 0.6 |
| t'50 | 0.9 | 0.8 | 1.9 | 0.9 | 0.7 |
| t'90 | 1.1 | 1.1 | 2.6 | 1.1 | 1.1 |

The results in Table 8 indicate a substantial acceleration of the cure response when the test temperature is raised to 200° C. as noted in the $t_s2$ values which are substantially reduced. The two stage effect is noted by the reduced values for $M_H$ for the compounds of the invention. The final crosslink density achieved after postcure however, is similar in the examples and Comparative Example C1 as shown in Table 10 below as evidenced by comparing the modulus and elongation values.

TABLE 9

| Press-cured (10 minutes at 177° C.) | | | | | |
|---|---|---|---|---|---|
| Example | 7 | 8 | 9 | 10 | C1* |
| Tensile, MPa | 10.4 | 10.8 | 10.9 | 10.1 | 9.5 |
| Elongation, % | 287 | 359 | 237 | 292 | 254 |
| Modulus, MPa | 3.5 | 2.7 | 4.2 | 3.0 | 4.4 |
| Shore A | 69 | 67 | 73 | 69 | 75 |

*C1 was press-cured 15 minutes at 177° C.

TABLE 10

| Post-cured (16 hours at 249° C.) | | | | | |
|---|---|---|---|---|---|
| Example | 7 | 8 | 9 | 10 | C1 |
| Tensile, MPa | 14.5 | 14.8 | 14.9 | 14.0 | 15.3 |
| Elongation, % | 186 | 189 | 163 | 202 | 182 |
| Modulus, MPa | 5.1 | 5.0 | 7.1 | 4.3 | 6.3 |
| Shore A pts. | 72 | 72 | 78 | 72 | 78 |
| Compression Set*, % | 18.9 | 18.6 | 23.9 | 21.5 | 15.9 |

The results in Table 10 show similar physical properties may be achieved even though cross link density during the 200° C. MDR test may only be 50% of the Control as seen by comparing $M_H$ values for Examples 8 and 10 with Comparative Example C1 in Table 8.

Evaluation of Compositions Comprising Blends of Alkyi or Allyl Carbonate Compounds With Conventional Crosslinking Agents

Example 11

In Example 11, a compounded fluoroelastomer gum of the invention was made and evaluated in a manner similar to Example 1 except the level of Onium F was 0.35 g instead of 0.5 g (1.3 mmhr)and 1.0 g of Bisphenol AF and 1.5 g of isopropyl carbonate-blocked Bisphenol AF (Carbonate E ) were used instead of Carbonate C. The results are listed in Table 12.

Examples 12–14

In Examples 12–14, compounded fluoroelastomer gums of the invention were made and evaluated in a manner similar to Example 11 except the onium used is listed in Table 11.

Comparative Example C2

In Comparative Example C2, a compounded fluoroelastomer gum was made in a manner similar to Example 11 except using the formulation listed in Table 11. No carbonate-blocked Bisphenol AF was used.

TABLE 11

| | Example | | | | |
|---|---|---|---|---|---|
| | 11 (mmhr) | 12 (mmhr) | 13 (mmhr) | 14 (mmhr) | C2 (mmhr) |
| Onium F | 0.9 | — | — | — | 1.3 |
| Onium A | — | 0.9 | — | — | — |
| Onium B | — | — | 0.9 | — | — |
| Onium C | — | — | — | 0.9 | — |
| Bisphenol AF | 3 | 3 | 3 | 3 | 6 |
| Carbonate E | 3 | 3 | 3 | 3 | — |

The compounded gums represented by the formulations in Table 11 were evaluated for cure rheology to produce the results listed in Table 12.

TABLE 12

| MDR Test Temperature of 177° C. | | | | | |
|---|---|---|---|---|---|
| Example | 11 | 12 | 13 | 14 | C2 |
| $M_L$ | 1.0 | 0.8 | 0.7 | 0.9 | 0.8 |
| $M_H$ | 10.8 | 10.0 | 11.9 | 12.5 | 20.0 |
| $t_s2$ | 0.6 | 0.7 | 0.7 | 0.5 | 1.3 |

TABLE 12-continued

| MDR Test Temperature of 177° C. | | | | | |
|---|---|---|---|---|---|
| Example | 11 | 12 | 13 | 14 | C2 |
| t'50 | 0.7 | 0.9 | 0.9 | 0.7 | 1.6 |
| t'90 | 3.7 | 3.8 | 2.7 | 3.3 | 2.8 |

The results in Table 12 indicate a two-stage cure rheology is obtained using the compounded gums of the invention as seen in the $M_H$ values when compared to Comparative Example C2. Only about one-half the maximum torque is obtained when using the compounded gums of the invention. When the article is later put through the post-cure cycle, the final physical properties obtained are similar to the properties obtained with the Comparative Example. These results are listed in Table 14 below.

The physical properties after a Press-cure of 10 minutes at 177° C. are listed in Table 13.

TABLE 13

| Press-Cured Materials | | | | | |
|---|---|---|---|---|---|
| Example | 11 | 12 | 13 | 14 | C2 |
| Tensile, MPa | 9.3 | 9.5 | 9.9 | 10.1 | 8.9 |
| Elongation, % | 419 | 393 | 344 | 367 | 254 |
| Modulus, MPa | 2.4 | 2.3 | 2.8 | 2.6 | 4.0 |
| Shore A, pts. | 68.5 | 64 | 68 | 69 | 69 |

The results in Table 13 indicate a partial or lower level of cross-linking has been achieved at the press-cure conditions as shown by the higher elongation values and lower modulus values for the examples of the invention when compared to the Comparative Example C2.

The physical properties after a Post-cure of 16 hours at 232° C. are listed in Table 14.

TABLE 14

| Post-Cured Materials | | | | | |
|---|---|---|---|---|---|
| Example | 11 | 12 | 13 | 14 | C2 |
| Tensile, MPa | 13.9 | 14.4 | 15 | 13.8 | 13.8 |
| Elongation, % | 238 | 218 | 183 | 201 | 209 |
| Modulus, MPa | 4.3 | 4.5 | 5.9 | 5.0 | 5.3 |
| Shore A, pts. | 70 | 68.5 | 73 | 71 | 75 |
| Comp. Set, % | 22.0 | 17.4 | 16.9 | 22.3 | 16.3 |

The results in Table 14 indicate comparable finished physical properties for the examples of the invention and Comparative Example C2, even though the torque obtained at lower temperature for the examples of the invention were only about one-half the value of the Comparative Example (see Table 12).

Examples 15–16

In Examples 15–16, compounded fluoroelastomer gums of the invention were made and evaluated in a manner similar to Example 1 except Gum B or Gum C were used with oniums and curatives as listed in Table 15.
Comparative Examples C3 and C4

In Comparative Examples C3 and C4, compounded fluoroelastomer gums were made and evaluated in a manner similar to Example 1 using the gums, onium and curatives listed in Table 15.

TABLE 15

| Example | 15 | C3 | 16 | C4 |
|---|---|---|---|---|
| Gum | B | B | C | C |
| Onium C, g | 0.77 | 0.77 | — | — |
| Onium B, g | — | — | 0.59 | 0.59 |
| Carbonate E, mmhr | 2.23 | — | 3 | — |
| Bisphenol AF, mmhr | 2.23 | 4.46 | 3 | 6 |

The rheology test results for the above materials are shown in Table 16.

TABLE 16

| MDR Test Temperature of 177° C. | | | | |
|---|---|---|---|---|
| Example | 15 | C3 | 16 | C4 |
| $M_L$ | 1.5 | 1.5 | 1.0 | 1.4 |
| $M_H$ | 15.3 | 15.6 | 9.2 | 15.4 |
| $t_s2$ | 3.2 | 5.2 | 0.7 | 2.6 |
| t'50 | 5.1 | 7.4 | 0.8 | 3.1 |
| t'90 | 10.0 | 12.7 | 1.6 | 4.6 |

The results in Table 16 show that useful cure characteristics are provided using the compositions of the invention.

Physical properties after press-cure and post-cure are shown in Tables 17 and 18.

TABLE 17

| Press-cure Properties (15 minutes at 177° C.) | | | | |
|---|---|---|---|---|
| Example | 15 | C3 | 16 | C4 |
| Tensile, MPa | 8.2 | 8.6 | 8.2 | 10.4 |
| Elongation, % | 337 | 335 | 451 | 298 |
| Modulus, MPa | 2.9 | 3.0 | 3.2 | 4.4 |
| Shore A, pts | 68 | 68 | 76 | 76 |

TABLE 18

| Post-cure Properties (16 hours at 232° C.) | | | | |
|---|---|---|---|---|
| Example | 15 | C3 | 16 | C4 |
| Tensile, MPa | 13.0 | 13.2 | 13.2 | 13.2 |
| Elongation, % | 206 | 205 | 239 | 219 |
| Modulus, MPa | 5.5 | 5.8 | 4.9 | 5.6 |
| Shore A, pts | 74 | 74 | 79 | 79 |
| Comp Set, % | 40.0 | 41.7 | 43.8 | 42.8 |

Examples 17–19

In Examples 17–19, compounded fluoroelastomer gums of the invention were made and evaluated in a manner similar to Example 1 except the oniums and curatives used are listed in Table 19.

Comparative Examples C5—C7

In Comparative Examples C5—C7, compounded fluoroelastomer gums were made and evaluated in a manner similar to Example 1 using the oniums and curatives as listed in Table 19. The bisphenol AF and Carbonate E levels are listed as mmhr and the oniums are listed in grams.

TABLE 19

| Example | 17 | C5 | 18 | C6 | 19 | C7 |
|---|---|---|---|---|---|---|
| Onium B | 0.36 | 0.36 | — | — | — | — |
| Onium D | — | — | 0.43 | 0.43 | — | — |
| Onium E | — | — | — | — | 0.33 | 0.33 |
| Bisphenol AF | 3 | 6 | 3 | 6 | 3 | 6 |
| Carbonate E | 3 | — | 3 | — | 3 | — |

The rheology test results for the above materials are shown in Table 20.

TABLE 20

MDR Test Temperature of 177° C.

| Example | 17 | C5 | 18 | C6 | 19 | C7 |
|---|---|---|---|---|---|---|
| $M_L$ | 1.2 | 1.5 | 1.0 | 1.2 | 1.2 | 1.2 |
| $M_H$ | 12.8 | 23.7 | 8.0 | 15.8 | 13.6 | 25.5 |
| $t_s2$ | 0.8 | 3.0 | 1.9 | 7.9 | 1.0 | 1.8 |
| t'50 | 0.8 | 3.0 | 1.9 | 7.9 | 1.0 | 1.8 |
| t'90 | 2.8 | 4.9 | 4.7 | 10.6 | 3.1 | 2.6 |

The results in Table 20 show that useful cure characteristics are provided using the compositions of the invention.

Physical properties after press-cure and post-cure are shown in Tables 21 and 22.

TABLE 21

Press-cure Properties (15 minutes at 177° C.)

| Example | 17 | C5 | 18 | C6 | 19 | C7 |
|---|---|---|---|---|---|---|
| Tensile, MPa | 10.1 | 9.2 | 7.5 | 8.3 | 9.0 | 10.1 |
| Elongation, % | 338 | 244 | 576 | 380 | 356 | 240 |
| Modulus, MPa | 3.0 | 4.4 | 2.1 | 3.4 | 3.1 | 5.1 |
| Shore A, pts. | 69 | 74 | 65 | 74 | 70 | 76 |

TABLE 22

Post-cure Properties (16 hours at 249° C.)

| Example | 17 | C5 | 18 | C6 | 19 | C7 |
|---|---|---|---|---|---|---|
| Tensile, MPa | 14.1 | 14.8 | 13.7 | 13.4 | 13.5 | 14.1 |
| Elongation, % | 164 | 169 | 265 | 254 | 188 | 154 |
| Modulus, MPa | 6.8 | 7.0 | 3.9 | 4.4 | 6.1 | 7.9 |
| Shore A, pts | 76 | 78 | 73 | 75 | 77 | 76 |
| Compression Set, % | 19.0 | 18.4 | 18.6 | 18.7 | 27.9 | 18.3 |

The results in Tables 21 and 22 show that similar physical prperties may be obtained when using compounds of this invention.

Examples 20 and 21

In Examples 20 and 21, a compounded flouroelastomer gum of the invention was prepared and evaluated in a manner similar to Example 1 except using the crosslinking agent and oniums listed in Table 23 below. Comparative Example C8 was also made and evaluated in a similar manner. The bisphenol AF and Carbonate levels are listed as mmhr and onium is listed in grams.

TABLE 23

| Example | 20 | 21 | C8 |
|---|---|---|---|
| Onium B | 0.36 | 0.36 | 0.36 |
| Carbonate E | 3 | 3 | — |
| Bisphenol AF | — | 3 | 6 |
| Carbonate A | 3 | — | — |

TABLE 24

MDR Test Temperature of 150° C.

| Example | 20 | 21 | C8 |
|---|---|---|---|
| $M_L$ | 1.8 | 1.9 | 2.5 |
| $M_H$ | 14.8 | 15.5 | 23.0 |
| $t_s2$ | 28.8 | 2.6 | 18.3 |
| t'50 | 31.1 | 3.3 | 23.7 |
| t'90 | 43.4 | 13.1 | 29.4 |

TABLE 25

MDR Test Temperature of 177° C.

| Example | 20 | 21 | C8 |
|---|---|---|---|
| $M_L$ | 1.0 | 1.2 | 1.5 |
| $M_H$ | 14.0 | 12.8 | 23.7 |
| $t_s2$ | 3.9 | 0.7 | 2.2 |
| t'50 | 4.3 | 0.8 | 3.0 |
| t'90 | 7.1 | 2.8 | 4.7 |

TABLE 26

Post-cure Properties (16 hours at 249° C.)

| Example | 20 | 21 | C8 |
|---|---|---|---|
| Tensile, MPa | 16.0 | 14.1 | 14.8 |
| Elongation, % | 150 | 164 | 169 |
| Modulus, MPa | 8.6 | 6.8 | 7.0 |
| Shore A, pts. | 76 | 76 | 78 |
| Compression Set, % | 17.9 | 19.0 | 18.4 |

The data in Tables 24–26 show the composition of Example 20 has a retarded cure on set and a two-stage effect, but reaches similar post-cure properties compared to C 8. Example 21 shows the two-stage cure effect but without the cure onset retardation when compared to C 8.

Example 22 and 23

In Examples 22 and 23, compounded fluoroelastomer gums of the invention were made and evaluated in a manner similar to Example 1 except using the formulation listed in Table 27. Carbonate H is 4,4'-(hexafluoropropylidenyl) bisphenyl bisallyl dicarbonate.

Comparative Example C9

In Comparative Example C9, a compounded fluoroelastomer gum was made in a manner similar to Example 22 except using the formulation listed in Table 27. No carbonate-blocked Bisphenol AF was used. The bisphenol AF and Carbonate F levels are listed as mmhr and the onium is listed in grams.

TABLE 27

| Example | 22 | 23 | C9 |
|---|---|---|---|
| Onium B | 0.36 | 0.36 | 0.36 |
| Bisphenol AF | — | 3 | 6 |
| Carbonate H | 6 | 3 | — |

The compounded gums represented by the formulations in Table 27 were evaluated for cure rheology to produce the results listed in Table 28.

TABLE 28

MDR Test Temperature of 177° C.

| Example | 22 | 23 | C9 |
|---|---|---|---|
| $M_L$ | 1.0 | 1.1 | 1.5 |
| $M_H$ | 8.3 | 18.9 | 23.7 |
| $t_s2$ | 0.8 | 0.9 | 2.2 |
| t'50 | 1.8 | 1.2 | 3.0 |
| t'90 | 7.0 | 2.0 | 4.7 |

The results in Table 28 indicate a two-stage cure rheology is obtained using the compounded gums of the invention as seen in the $M_H$ values when compared to Comparative Example C9. The maximum torque is reduced when using the compounded gums of the invention. When the article is later put through the post-cure cycle, the final physical properties obtained are similar to the properties obtained with the Comparative Example. These results are listed in Table 30 below.

The physical properties after a Press-cure of 15 minutes at 177° C. are listed in Table 29.

TABLE 29

Press-Cured Properties (15 min. at 177° C.)

| Example | 22 | 23 | C9 |
|---|---|---|---|
| Tensile, MPa | 11.3 | 9.9 | 9.2 |
| Elongation, % | 390 | 233 | 244 |
| Modulus, MPa | 2.6 | 4.4 | 4.4 |
| Shore A, pts. | 65 | 72 | 74 |

The results in Table 29 indicate a partial or lower level of cross-linking has been achieved at the press-cure conditions as shown by the higher elongation values and lower modulus values for Example 22 when compared to the Comparative Example C9.

The physical properties after a Post-cure of 16 hours at 232° C. are listed in Table 30.

TABLE 30

Post-Cured Properties (16 hrs. at 232° C.)

| Example | 22 | 23 | C9 |
|---|---|---|---|
| Tensile, MPa | 13.9 | 14.4 | 13.8 |
| Elongation, % | 238 | 218 | 209 |
| Modulus, MPa | 4.3 | 4.5 | 5.3 |
| Shore A, pts. | 70 | 68.5 | 75 |

The results in Table 30 indicate comparable finished physical properties for the examples of the invention when compared to Comparative Example C9.

Examples 24–25

In Examples 24–25, compounded fluoroelastomer gums of the invention were made and evaluated in a manner similar to Example 1 except the oniums and curatives used are as listed in Table 31. F diol-1 is the fluorinated ether diol used to make Carbonate L.

Comparative Examples C10–C11

In Comparative Examples C10–C11, compounded fluoroelastomer gums were made and evaluated in a manner similar to Example 1 using the oniums and curatives as listed in Table 31. The Fluorinated diol levels are listed as mmhr and the onium is listed in grams.

TABLE 31

| Example | 24 | C10 | C11 | 25 |
|---|---|---|---|---|
| Onium B | 0.27 | 0.27 | 0.27 | 0.27 |
| F diol 1 | 8 | 16 | 8 | 8 |
| Carbonate L | 8 | — | — | — |
| Carbonate M | — | — | — | 6.9 |

The rheology test results for the above materials are shown in Table 32.

TABLE 32

MDR Test Temperature of 177° C.

| Example | 24 | C10 | C11 | 25 |
|---|---|---|---|---|
| $M_L$ | 0.31 | 0.30 | 1.12 | 0.39 |
| $M_H$ | 8.36 | 15.64 | 9.61 | 10.9 |
| $t_s2$ | 2.17 | 1.65 | 0.69 | 2.9 |
| t'50 | 3.43 | 2.88 | 1.10 | 4.74 |
| t'90 | 8.13 | 6.44 | 4.85 | 9.1 |

The results in Table 32 show that useful cure characteristics are provided using the compositions of the invention. The two-stage effect is seen by comparing the $M_H$ values of Examples 24 and 25 with Comparative Example C10. At this temperature, the torque result is more like that shown in Comparative Example C 11 which has the same level of F diol 1 as in Examples 24 and 25. The physical properties of Examples 24 and 25, such as elongation and compression set (see Table 34), show a higher crosslink density than Comparative Example C11 which indicates at least some of the F-diol-dicarbonates of the invention have participated in the cure.

Physical properties after press-cure and post-cure are shown in Tables 33 and 34.

TABLE 33

Press-cure Properties (10 minutes at 177° C.)

| Example | 24 | C10 | C11 | 25 |
|---|---|---|---|---|
| Tensile, MPa | 6.5 | 6.4 | 6.9 | 5.9 |
| Elongation, % | 282 | 193 | 396 | 271 |
| Modulus, MPa | 2.0 | 3.3 | 2.7 | 2.3 |
| Shore A, pts. | 58 | 67 | 69 | 62 |

TABLE 34

Post-cure Properties (16 hours at 232° C.)

| Example | 24 | C10 | C11 | 25 |
|---|---|---|---|---|
| Tensile, MPa | 10.3 | 10.3 | 10.3 | 10.2 |
| Elongation, % | 181 | 151 | 257 | 212 |
| Modulus, MPa | 4.8 | 6.2 | 4.5 | 4.0 |
| Shore A, pts. | 67 | 71 | 73 | 70 |
| Compression Set, % | 26.9 | 18.5 | 40.6 | — |

The results in Tables 33 and 34 show that similar physical properties may be obtained when using compounds of this invention.

We claim:
1. A curable fluoroelastomer composition comprising:
   (a) fluorine-containing polymer or blend of fluorine-containing polymers each comprising interpolymerized units derived from one or more fluorine-containing ethylenically unsaturated monomers;
   (b) organo-onium compound; and
   (c) aryl, allyl or alkyl carbonate-blocked compound as a crosslinking agent.
2. The composition of claim 1 wherein said carbonate-blocked crosslinking agent is selected according to the formula:

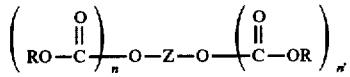

wherein:
Z is an aryl or polyaryl group or is a fluorinated ether or aliphatic diol group of the formula:

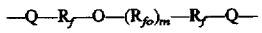

wherein each $R_f$ is, independently, a linear or branched perfluoroalkylene group of 1 to about 20 carbon atoms; $R_{fo}$ comprises linear or branched perfluoroalkylene ether groups wherein said groups may be random, block, or any combination thereof; each Q is, independently, a divalent linking group; m is a number from 0 to 30; and y is 0 or 1; and R is an aryl group or is an allyl or alkyl substituent of the formula $CX(R')_2$ where X is hydrogen or a halogen atom other than fluorine and where each R' is, independently from the other, a substantially non-fluorinated alkyl or allyl group that may be straight-chained, branched, cyclic or acyclic and that may optionally contain one or more catenary heteroatoms; and n and n' each is independently selected as 0 or 1 with the proviso that at least one of n and n' is 1 and when either n or n' is 0, its corresponding portion of the Z moiety is terminated by hydrogen (i.e., its corresponding terminal portion is —Z—OH) or is terminated by a metal or nonmetal cation.

3. The composition of claim 1 wherein said organo-onium compound comprises acid-functional organo-onium compound.
4. The composition of claim 1 wherein said organo-onium compound comprises one or more pendent fluorinated alkyl groups.
5. The composition of claim 1 further comprising fluoroaliphatic sulfonamide.
6. The composition of claim 1 wherein the fluorine-containing polymer comprises a copolymer of vinylidene fluoride and at least one terminally ethylenically-unsaturated fluoromonomer other than vinylidene flouride.
7. The composition of claim 1 wherein one or more of the fluorine-containing polymers comprise a copolymer of vinylidene fluoride and hexafluoropropene.
8. The composition of claim 1 wherein one or more of the fluorine-containing polymers comprise a terpolymer of vinylidene fluoride, hexafluoropropene, and tetrafluoroethylene.
9. A curable fluoroelastomer composition exhibiting improved safety against scorch phenomena comprising:
   (a) fluorine-containing polymer comprising interpolymerized units derived from one or more fluorine-containing ethylenically unsaturated monomers;
   (b) organo-onium compound; and
   (c) aryl carbonate-blocked compound as a crosslinking agent.
10. The composition of claim 9 wherein said aryl carbonate-blocked crosslinking agent is selected according to the formula:

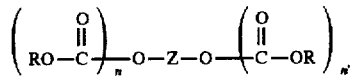

wherein:
Z is an aryl or polyaryl group or is a fluorinated ether or aliphatic diol group of the formula:

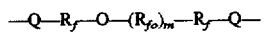

wherein each $R_f$ is, independently, a linear or branched perfluoroalkylene group of 1 to about 20 carbon atoms; $R_{fo}$ comprises linear or branched perfluoroalkylene ether groups wherein said groups may be random, block, or any combination thereof; each Q is, independently, a divalent linking group; m is a number from 0 to 30; and y is 0 or 1; and R is an aryl substituent according to the formula:

wherein x is a number between 1 and 4 inclusive and R' is hydrogen, a halogen, or is an acyl, aryl, polyaryl (fused to or separated from the aromatic ring) or an alkyl radical substituent the latter three of which may be straight-chained, branched, cyclic, or halogenated and which may optionally contain one or more catenary heteroatoms; and n and n' each is independently selected as 0 or 1 with the proviso that at least one of n and n' is 1 when either n or n' is 0, its corresponding portion of the Z moiety is terminated by hydrogen (i.e., its corresponding terminal portion is —Z—OH) or is terminated by a metal or nonmetal cation.

11. The composition of claim 9 wherein said organo-onium compound comprises acid-functional organo-onium compound.
12. The composition of claim 9 wherein said organo-onium compound comprises one or more pendent fluorinated alkyl groups.
13. The composition of claim 9 further comprising fluoroaliphatic sulfonamide.
14. The composition of claim 9 wherein the fluorine-containing polymer comprises a copolymer of vinylidene fluoride and at least one terminally ethylenically-unsaturated fluoromonomer other than vinylidene flouride.
15. The composition of claim 9 wherein one or more of the fluorine-containing polymers comprise a terpolymer of vinylidene fluoride, hexafluoropropene, and tetrafluoroethylene.
16. A method of making a shaped elastomeric article comprising curing the composition of claim 1 to form the article.
17. A method of making a shaped elastomeric article comprising curing the composition of claim 9 to form the article.
18. A cured article made according to the method of claim 16.
19. A cured article made according to the method of claim 17.

* * * * *